United States Patent
Okada

(10) Patent No.: US 7,349,021 B2
(45) Date of Patent: Mar. 25, 2008

(54) IMAGING APPARATUS AND IMAGING SYSTEM CONTROL METHOD

(75) Inventor: Shunji Okada, Kanagawa (JP)

(73) Assignee: Sony Corporation (JP)

( * ) Notice: Subject to any disclaimer, the term of this patent is extended or adjusted under 35 U.S.C. 154(b) by 785 days.

(21) Appl. No.: 10/886,901

(22) Filed: Jul. 8, 2004

(65) Prior Publication Data

US 2005/0052407 A1    Mar. 10, 2005

(30) Foreign Application Priority Data

Jul. 16, 2003 (JP) ............................. P2003-275231

(51) Int. Cl.
*H04N 5/222* (2006.01)

(52) U.S. Cl. ................................................ 348/333.06

(58) Field of Classification Search ............ 348/333.06
See application file for complete search history.

(56) References Cited

U.S. PATENT DOCUMENTS

| | | | | |
|---|---|---|---|---|
| 5,739,859 A | * | 4/1998 | Hattori et al. | 348/375 |
| 6,091,450 A | * | 7/2000 | Hirasawa | 348/333.01 |
| 6,115,069 A | * | 9/2000 | Kuroki et al. | 348/375 |
| 6,597,400 B2 | * | 7/2003 | Nishimura | 348/333.02 |
| 6,778,217 B1 | * | 8/2004 | Nishimura | 348/333.12 |
| 6,912,005 B2 | * | 6/2005 | Senda | 348/333.06 |
| 6,937,280 B2 | * | 8/2005 | Kawai et al. | 348/333.06 |
| 7,046,286 B1 | * | 5/2006 | Kobayashi et al. | 348/333.06 |

* cited by examiner

*Primary Examiner*—Ngoc-Yen Vu
*Assistant Examiner*—Adam L. Henderson
(74) *Attorney, Agent, or Firm*—Lerner, David, Littenberg, Krumholz & Mentlik, LLP

(57) ABSTRACT

In order to prevent an erroneous operation from occurring due to erroneously operating an operation button during adjustment of the angle of a display panel, various operation buttons are provided on a display panel, which is provided on a side surface of a main unit of an imaging apparatus. In this way an angle, at which the display panel is disposed, is suitably adjusted by a tilting mechanism. Moving images and still images are recorded and reproduced by operating this operation button, and a buffer is provided for temporarily storing data between an imaging section and a recording/reproducing section, so that data is processed through this buffer. A displacement detection unit detects displacement of the display panel and erroneous operation is detected if there is displacement of the display panel within a time lapse after operating the operation button, the operation is canceled, and the display panel is returned to an original status.

10 Claims, 14 Drawing Sheets

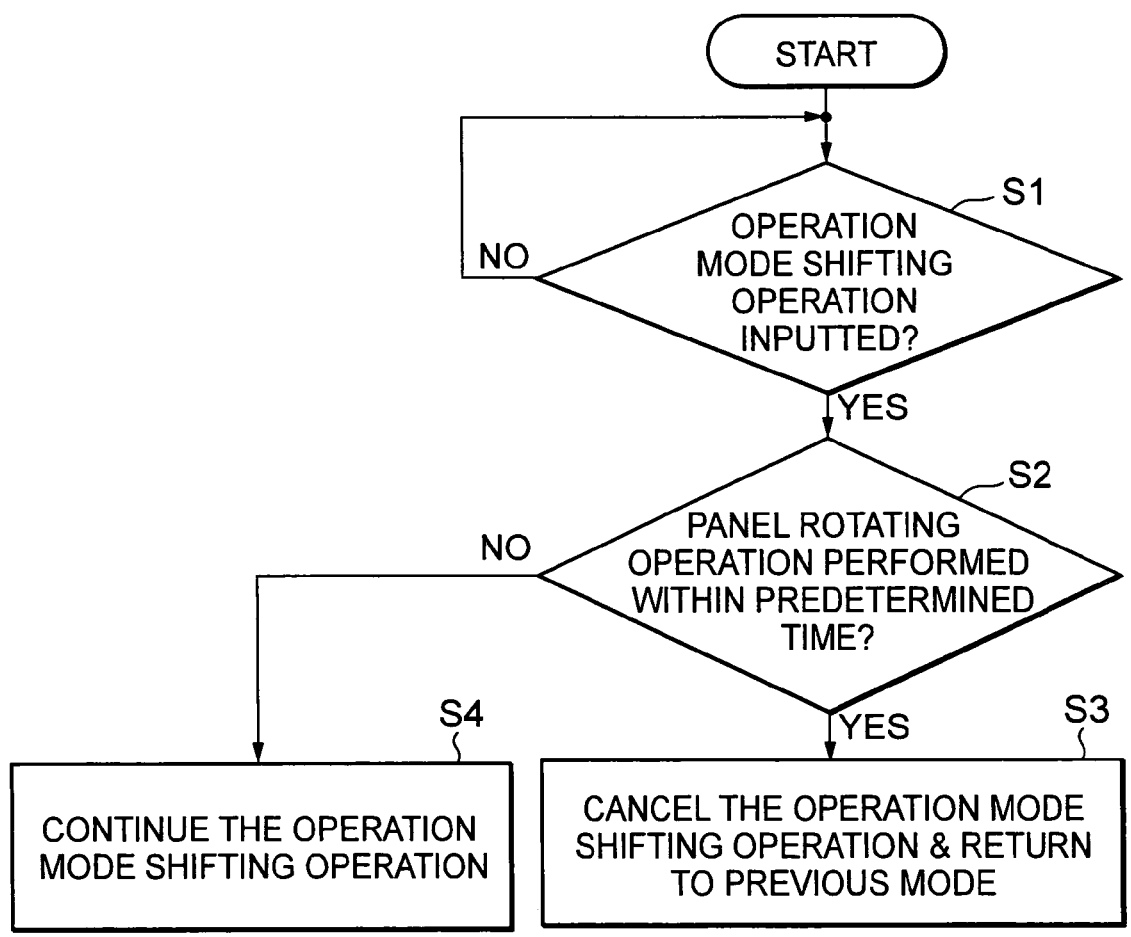

IMAGING APPARATUS AND IMAGING SYSTEM CONTROL METHOD

CROSS REFERENCE TO RELATED APPLICATIONS

The present document is based on Japanese Priority Application JP2003-257231 filed to the Japanese Patent Office on Jul. 16, 2003, the contents in which being incorporated herein by reference to the extent permitted by law.

BACKGROUND OF THE INVENTION

1. Field of the Invention

The present invention relates to an imaging apparatus having a tilting display panel on which various kinds of operation buttons are provided.

2. Related Art

Imaging apparatuses such as camera integrated recorders provided with a display panel for confirming images have been conventionally used. The display panel of such imaging apparatuses is provided in a main unit of the imaging apparatus through a tilting mechanism, which includes a rotating mechanism and a hinge mechanism, in such a way as to be able to be disposed at various angles and as to be used, for example, as a large viewfinder by a photographer for confirming images, or by an object person for confirming a facial expression and so on thereof, and also used for various purposes. Moreover, an imaging apparatus provided with this display panel, on which various kinds of operation buttons are mounted, so as to meet downsizing requirement thereof has been introduced to practical applications. Also, an imaging apparatus has been available using touch panel type switches, which are combined with display on the screen of a display panel as the operation buttons, for example in Japanese Patent Application Publication No. 2001-53995.

SUMMARY OF THE INVENTION

If there are various kinds of operation buttons provided on the display panel, and the panel is tiltably provided on the main unit of the imaging apparatus as above-mentioned, there is risk that a user's finger may inadvertently touch an operation button and perform an erroneous operation when an operation of displacing the display panel is performed with the power supply turned on.

For example, if recording of a moving image is performed in a continuously manner, if a stop button is erroneously operated when trying to change the angle at which the display panel is disposed, to another angle at which the display panel can be easily viewed, the continuous image recording is interrupted. As a result, a chance may be lost to capture an image which could have been an important record and, therefore, an appropriate recording cannot be achieved.

Still further, if a recording button is erroneously operated when the angle, at which the display panel is disposed, is adjusted in a state in which an operation is stopped, an unnecessary image is captured and recorded. As a result, it becomes necessary to delete such undesired image.

In addition, if an incorrect operation due to such an erroneous operation occurs, and where a used recording medium is, for example, a write-once DVD-R image disc, or a write-once CD-R, there has been a problem in which the recording medium is wasted. Alternatively, even if a used recording medium is a rewritable DVD-RW image disc, a rewritable CD-RW, HDD, a memory card or the like, there are caused problems that troublesome resetting operations, that is, deletion of data files continuously recorded on the medium in a file system so as to perform recording thereon again, and that thus, smooth imaging is extremely hindered.

Accordingly, the invention has been conceived in order to alleviate the above mentioned problems by providing an imaging apparatus enabled to prevent an occurrence of an erroneous operation, ensure an appropriate operating state and facilitate return to the appropriate operation even if an operation button is erroneously operated when a display panel, which is tiltably provided in a main unit of the imaging apparatus and with operation buttons, is tilt-operated.

In view of the above-mentioned problems, according to a preferred embodiment of the invention, there is provided an imaging apparatus that includes a main unit of the apparatus, which is provided with an imaging section for imaging an object, a recording section for storing image data of an image captured by the imaging section, a display panel provided to have free tilting movement through a tilting structure of the main body; operation buttons provided on the display panel, detection means for detecting tilting displacement of the display panel, a data buffer for temporarily storing image data, and controller for performing, when shifting of an operation mode is instructed by the operation button, an operation mode corresponding to the instruction, for temporarily storing the image data by using the data buffer, for monitoring tilting displacement of the display panel by the detection means, for canceling, when the tilting displacement of the display panel is detected within a time lapse, the shifting of the operation mode, and for returning the operation mode to an original operation mode.

Still further, according to another preferred embodiment of the invention, there is provided an imaging system control method that includes an imaging process of imaging an object by an imaging section provided in a main unit of the apparatus, a recording process of storing image data of an image captured by the imaging section, a displaying process of displaying the image data on a display panel, which is tiltably provided on a main unit of the apparatus through a tilting mechanism, an operating process of operating operation buttons provided on the display panel, a detecting process of detecting tilting displacement of the display panel, a temporary storage data buffer process of temporarily storing image data, and a control process of performing, when shifting of an operation mode is instructed by the operation button, an operation mode corresponding to the instruction, of temporarily storing the image data by using the data buffer, of monitoring tilting displacement of the display panel by the detection means, of canceling, when the tilting displacement of the display panel is detected within a time lapse, the shifting of the operation mode, and of returning the operation mode to an original operation mode.

According to the imaging apparatus and the imaging system control method of according to the preferred embodiments of the present invention, in the case the shifting of the operation mode is instructed by the operation button provided on the display panel, an operation mode corresponding to the instruction is performed. Image data is temporarily stored by using the data buffer. In the case where the tilting displacement of the display panel is detected within the time lapse, it is decided that the button operation is an erroneous operation. Then, the shifting of the mode is canceled. The operation mode is returned to the original operation mode. Thus, even in the case where the operation button is erroneously operated when the display panel is tilt-operated, an occurrence of an erroneous operation due thereto can be prevented. An appropriate operating state can be ensured. Unnecessary data recording and reproducing operations on the recording medium can be extruded. Thus, the abrasion of the recording medium can be prevented from occurring. Also, the necessity for a recovery operation associated with an erroneous operation is eliminated. This can facilitate the return to an appropriate operation.

BRIEF DESCRIPTION OF THE DRAWINGS

The above and other objects and features of a preferred embodiment of the present invention will become more readily apparent to those of ordinary skill in the art from the following detailed description taken in conjunction with the accompanying drawings in which:

FIG. 3 is a flowchart illustrating an operation of the preferred embodiment of the invention;

DETAILED DESCRIPTION OF THE PREFERRED EMBODIMENTS OF THE PRESENT INVENTION

Figure 1A:
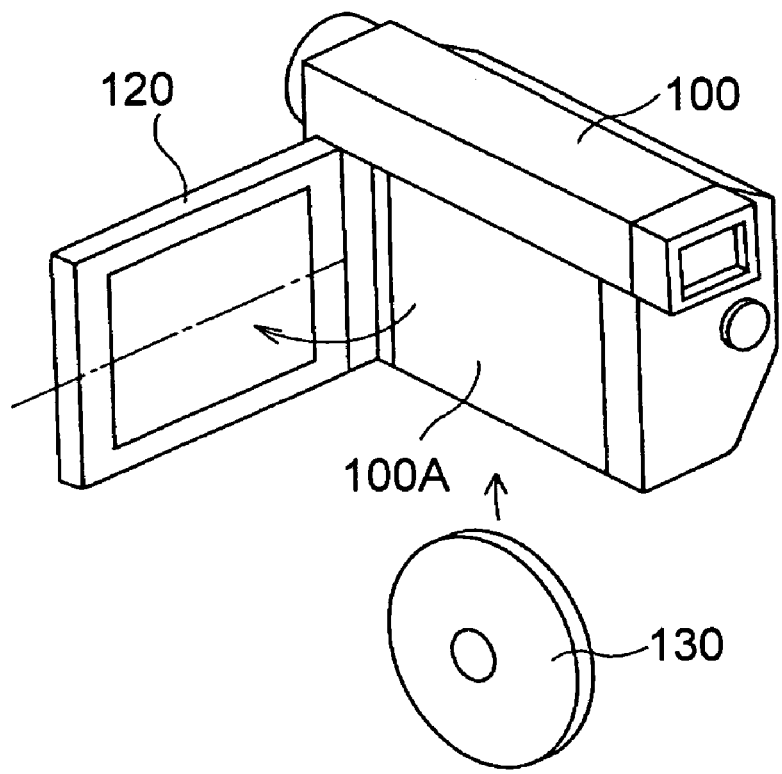
FIG. 1 is a perspective view illustrating a camera-integrated recorder according to a preferred embodiment of the invention.

Preferred embodiments of the present invention are configured so that various kinds of operation buttons of a touch panel-type, for example, are provided on a display panel such as an LCD one or an organic EL one, which is tiltably provided on a side surface of a main unit of an imaging apparatus by a tilting mechanism. Such mechanism includes a hinge mechanism and a rotative mechanism which are provided in order to allow a user to confirm an object, which is to be image-captured, by visually checking an image displayed on this display panel and to record and reproduce moving images and/or still images by operating the operation buttons provided on the display panel.

Also, a buffer for temporarily storing data is provided between an imaging section capturing an image of the subject and a recording/reproducing section, so that at an imaging operation and so forth, data is processed through this buffer.

Also, a displacement detection means for detecting displacement of the display panel is provided, and a controller for monitoring timing, with which the operation button of the display panel is operated, and a detection signal outputted from the displacement detection means, for deciding, when the displacement of the display panel occurs within a time lapse with respect to the timing, with which the operation button is operated, that the operation of the operation button is an erroneous one, and that an operation of the panel due to the operation performed on the button is canceled, and for returning the state of the imaging apparatus to a state thereof before the erroneous operation is performed.

Therefore, the apparatus can be prevented from performing unnecessary data recording and reproducing operations in response to erroneous operations of the operation button during an operation of adjusting the angle, at which the display panel is disposed, from interrupting an operation performed during recording or reproducing, and also effectively prevented from damaging image data, wasting recoding media, deteriorating operability, and missing a chance of imaging, and the invention provides an easy-to-use imaging apparatus.

[First Example of Preferred Embodiment of the Present Invention]

An imaging apparatus according to a first example of preferred embodiment of the present invention is an application of the invention to a camera-integrated recorder. FIG. 1 is a perspective view illustrating an external view of a camera-integrated recorder according to this example of preferred embodiment of the present invention. FIG. 2 is a block diagram illustrating the system configuration of the camera-integrated recorder shown in FIG. 1. FIG. 3 is a flowchart illustrating an outline of an operation of this example of preferred embodiment of the present invention.

As shown in FIG. 1, the camera-integrated recorder of this example of preferred embodiment of the present invention has an apparatus main unit 100 of the apparatus, which incorporates an imaging section and a signal processing section, and a display panel 120 provided on a side part of this apparatus main unit 100 through a tilting mechanism 110, which includes a rotative mechanism and a hinge mechanism, in such a way as to adjust an angle at which the display panel 120 is disposed. The recorder performs recording and reproducing moving images by using an exchangeable recording medium 130, such as an optical disc.

Figure 1B:
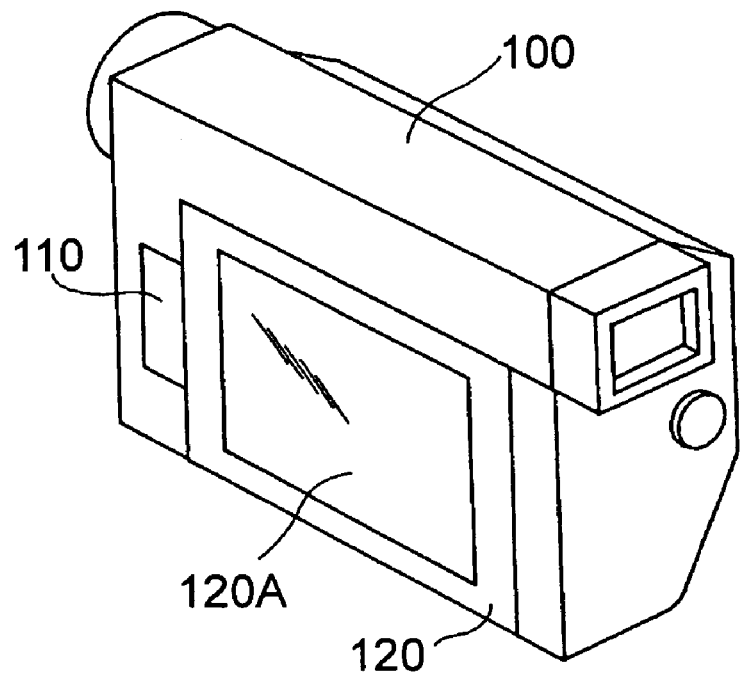
Figure 2A:
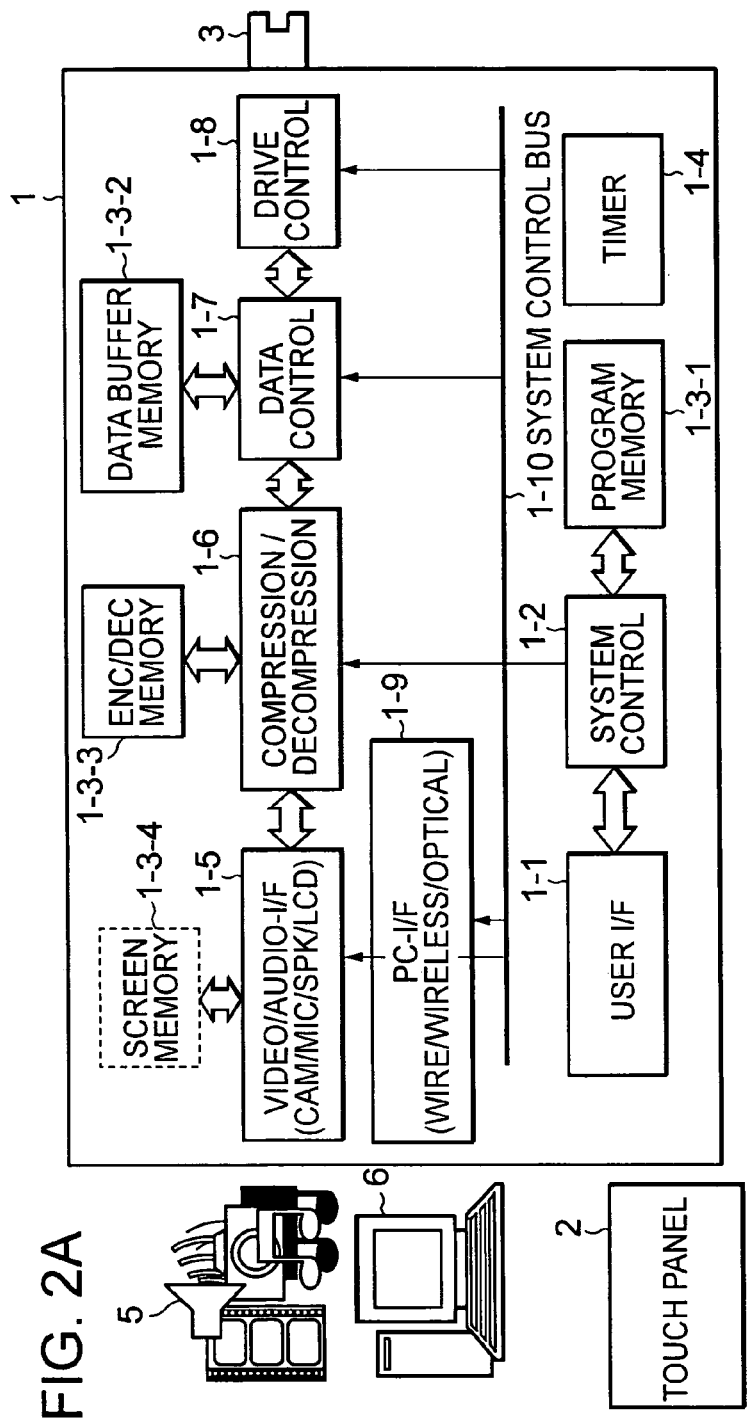
FIG. 2 is a block diagram illustrating the hardware configuration of the camera-integrated recorder shown in FIG. 1.

The display panel 120 can be operated to open/close from a status of being outwardly opened with the display panel 120 accommodated in an accommodating section 100A provided in a side section of the apparatus main unit 100 (FIG. 1(A)), to a state in which the display panel 120 is used as a viewfinder (FIG. 1(B)). Also, the angle at which the display panel 120 is disposed can be adjusted in a state in which the display panel 120 is opened.

Still further, operation buttons (omitted in FIG. 1) of the touch panel type are provided in a display screen 120A of this display panel 120. Various kinds of operations, such as recording and reproducing, can be designated by a finger.

Also, a sensor for detecting change in the state of the display panel 120 is provided in the tilting mechanism 110.

Next, the hardware system configuration of this apparatus is described with reference to FIG. 2.

Host system 1 controls the entire system of this apparatus and is configured by having various kinds of interfaces connecting a recording medium, an external PC and so on thereto.

First, a user interface 1-1 receives user input by using a key input button and also using a key input switch, for example, from a touch panel 2 and so on, and displays the state of this apparatus by using light emitting elements and acoustic elements.

A system control section 1-2 is a system control processor and has a system control bus 1-10 and a program memory 1-3-1.

The program memory 1-3-1 functions as a program storage memory and a working memory for the system control processor. A file system is loaded therein.

A timer 1-4 is a real time clock and performs basic clocking for the system processor.

A video/audio interface 1-5 has a graphic display output section for various kinds of video/acoustic equipment, such as a camera image input, a microphone input, a speaker input, and liquid crystal image monitor. By the way, this graphic display output section may be provided with a screen memory 1-3-4 so as to compute output signals for displaying characters/graphics, such as icons.

A PC interface 1-9 serves as an interface with a PC.

A compression/decompression section 1-6 is a codec (encoder-decoder), which performs compression/decompression of video/audio signals and is a block for performing highly compressed signal processing in accordance with MPEG1 format, MPEG2 format, MPEG3 format, MPEG4 format, or a compression/decompression format for compression/decompression of moving images and still images, which is expected to be put to practical use in future. This block is provided with an encoder-decoder memory 1-3-3 and used as a storage section for compression of a difference signal between frames or fields of moving image signals.

A data control section 1-7 performs a "Fast In Fast Out" buffer operation between data transfer processing, which is performed by a section 1-8 according to a handshaking protocol for a media device (to be described later), and continuous stream transfer processing needed for the above-mentioned compression/decompression. Still further, a memory to be used as a data buffer region is a data memory 1-3-2.

A device interface control section 1-8 performs handshaking with the memory 1-3-2 through the data control section 1-7 and performs data transfer with a media drive (omitted in FIG. 1) through a slot 2 by performing discontinuous handshaking protocol processing in conformity to ATA/ATAPI protocol standards with a media drive (omitted in FIG. 1) through a slot 2.

Figure 2B:

On the other hand, FIG. 2(B) shows an example of data stored in the recording medium. As shown in this figure, in this example of preferred embodiment, imaging attribute information, such as a date and user information, which includes users' comments, are stored in the recording medium as registration information. Still further, image information data is stored therein by being compressed in a predetermined format.

Next, a basic operation of this example of preferred embodiment of the present invention is described with reference FIG. 3.

If a user erroneously operates the touch panel when adjusting an angle at which the display panel is disposed, and thus an erroneous operation occurs, it is decided by detecting subsequent displacement of the display panel that a first operation is an erroneous one. Then, an operation, which is being performed, is canceled.

As illustrated in FIG. 3, a system controller monitors inputs from the touch panel and monitors displacement (a panel turn operation) of the display panel. In case some shifting of the operation mode is caused by an operation inputted from the touch panel, in step S1, an operation is performed according to operation content, and a panel turn operation within a time lapse is monitored, in step S2. Then, in case this panel turning operation is detected, the operation mode shifting operation is canceled, and the operation mode is returned to a previous mode, in step S3. By the way, this apparatus is configured so that data to be processed is temporarily stored in the data buffer according to the operation mode, if necessary, and that the operation mode is thus canceled without affecting the recording medium and the data.

Still further, in case where no panel turn operation is detected, the operation mode shifting operation is validated, and the shifted operation is continued without change, in step S4.

As a result, the shifting of the operation mode is performed by quickly responding to the operation performed on the touch panel. For example, a recording operation is performed without missing a photo opportunity. An appropriate recovery operation can be performed in response to an erroneous operation. The wastage of a recording medium and the damage of data can be prevented from occurring.

Next, concrete examples of a configuration and an operation of the apparatus constituted as above-mentioned are described.

First, FIG. 4 to FIG. 7 are views showing a first concrete example and illustrate a case of applying the functions of this example of preferred embodiment of the present invention to a recording operation. By the way, constituents common to these figures are described by being designated by same reference characters.

In this example, the storing of imaging data in the buffer is started in when an operation of beginning a recording mode by panel touch input is detected. A panel turn operation detection signal is monitored over a time period. When the detection signal is detected, the operation mode is forcibly returned from the recording mode to a standby mode.

Figure 4:
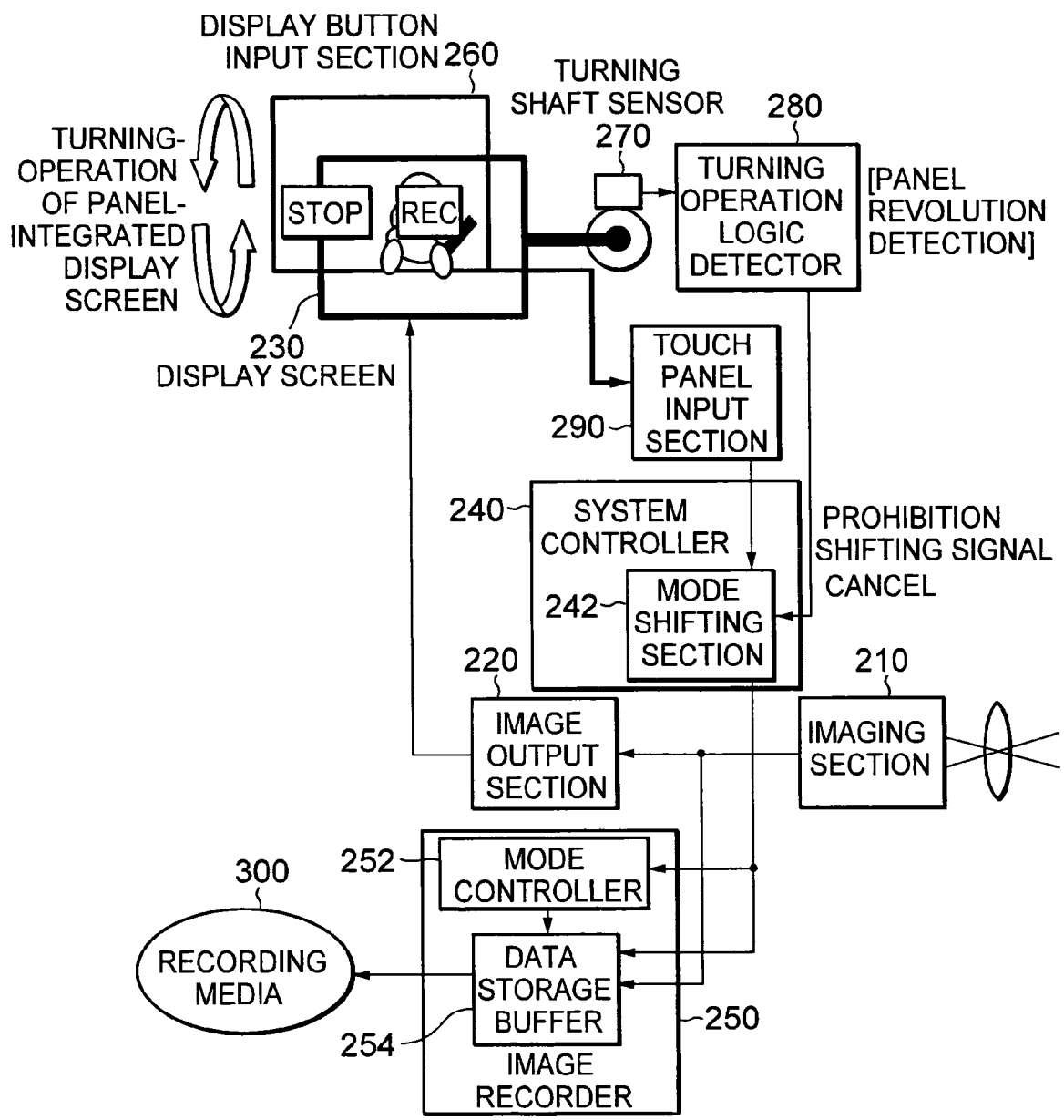
FIG. 4 is a block diagram illustrating a first example of the concrete configuration of the preferred embodiment of the invention.

As shown in FIG. 4, the imaging apparatus of this example of preferred embodiment of the present invention has an imaging block 210, a CAM image output section 220, a display screen 230, a system controller 240, an image recorder 250, a display button input section 260, a turning shaft sensor 270, a turning operation logic detector 280, and a touch panel input section 290. Moving images captured by the imaging block 210 are recorded in the recording medium 300.

The turning shaft sensor 270 is operative to detect a turn of a support shaft of the display panel. The turning operation logic detector 280 detects a revolution of the display panel from a detection signal sent from this turning shaft sensor 270.

Still further, the system controller 240 is provided with a mode shifting section 242. The image recorder 250 is provided with a mode controller 252 and a data storage buffer 254.

The imaging block 210 outputs a captured image to the display screen 230 through the CAM image output section 220 and records data after the data is stored in the Data storage buffer 254 of the image recording section 250 for a time period.

The display button input section 260 detects that a recording (REC) button designation area region is touched. Then, the section 260 outputs XY coordinates to the touch panel input section 290. The touch panel input section 290 discriminates whether or not the XY coordinates are within a recording button display region range. Then, the section 290 inputs a signal to the mode shifting section 242 in the system controller 240.

The mode shifting section 242 of the system controller 240 receives a touch input signal from the touch panel input section 290 and then outputs a mode shifting signal to the mode controller 252 of the image recorder 250.

The mode controller 252 of the image recorder 250 receives the mode shifting signal from the mode shifting section 242 of the system controller 240 and then shifts the mode of the image recorder 250 from the standby mode to a camera recording mode in which record compressed data of a camera-captured image is created and stored in the Data storage buffer 254.

The record compressed data is written to the recording medium 300 from the image recorder 250.

The display screen 230 is turnably latched to the main unit of the imaging apparatus. A detection signal is inputted to the turning operation logic detector 280 from the turning shaft sensor 270 for detecting a turn of the shaft of the display screen 230.

The turning operation logic detector 280 outputs a turning operation logic detection signal as a logic signal. In the mode shifting section 242 of the system controller 240, which receives the turning operation logic detection signal, a mode transition control operation of forcibly returning the mode to the standby mode, in which the apparatus is set before the recording operation is started, is performed, in the course of the storage of the data in the buffer 254 after the recording operation is started.

As a result, recording of data in the recording medium 300 is prevented from being started by an erroneous touch to the operation button during the panel turn operation.

Figure 5:
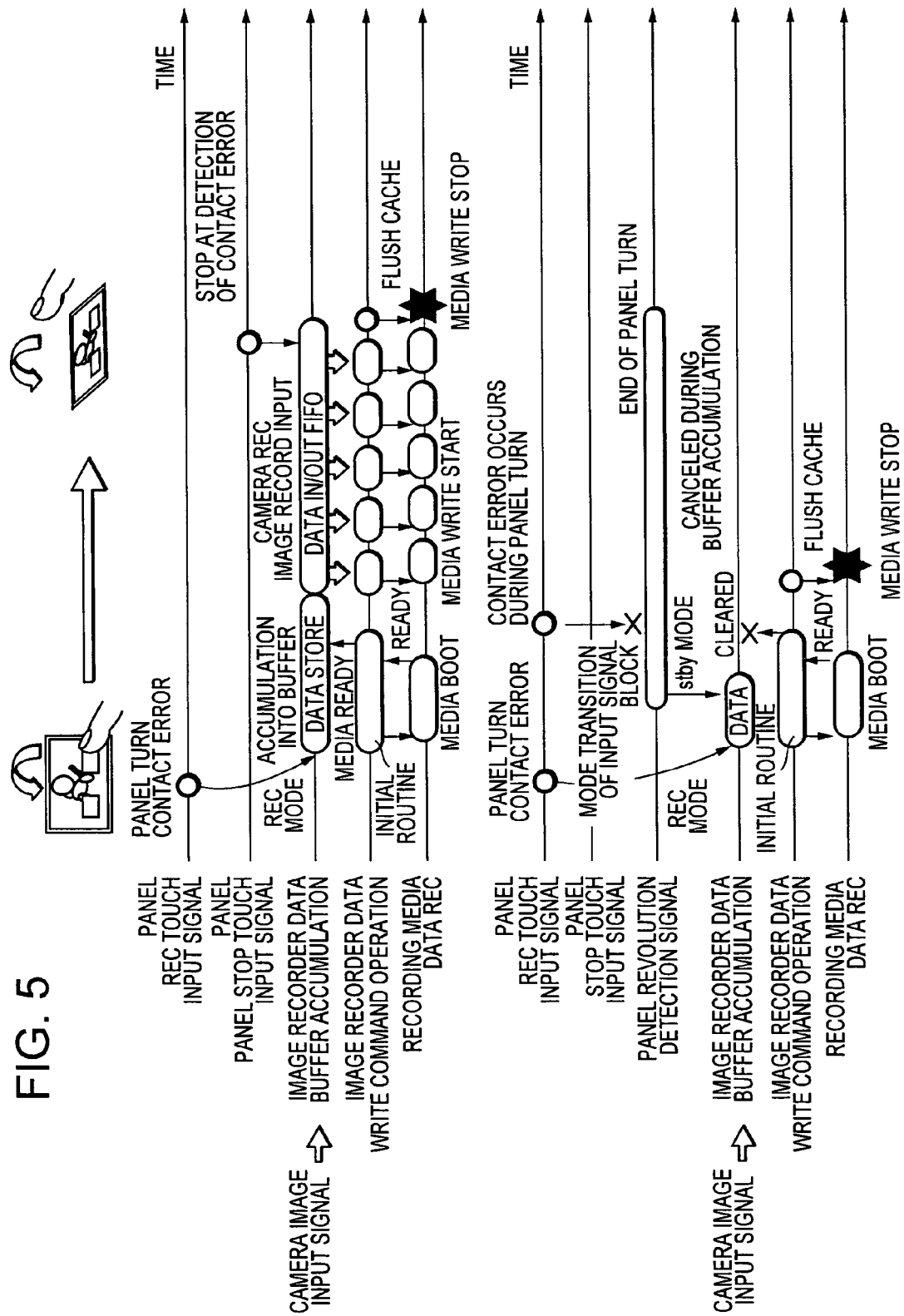
FIG. 5 is an explanatory view illustrating an example of an operation of an apparatus shown in FIG. 4.
Figure 6:
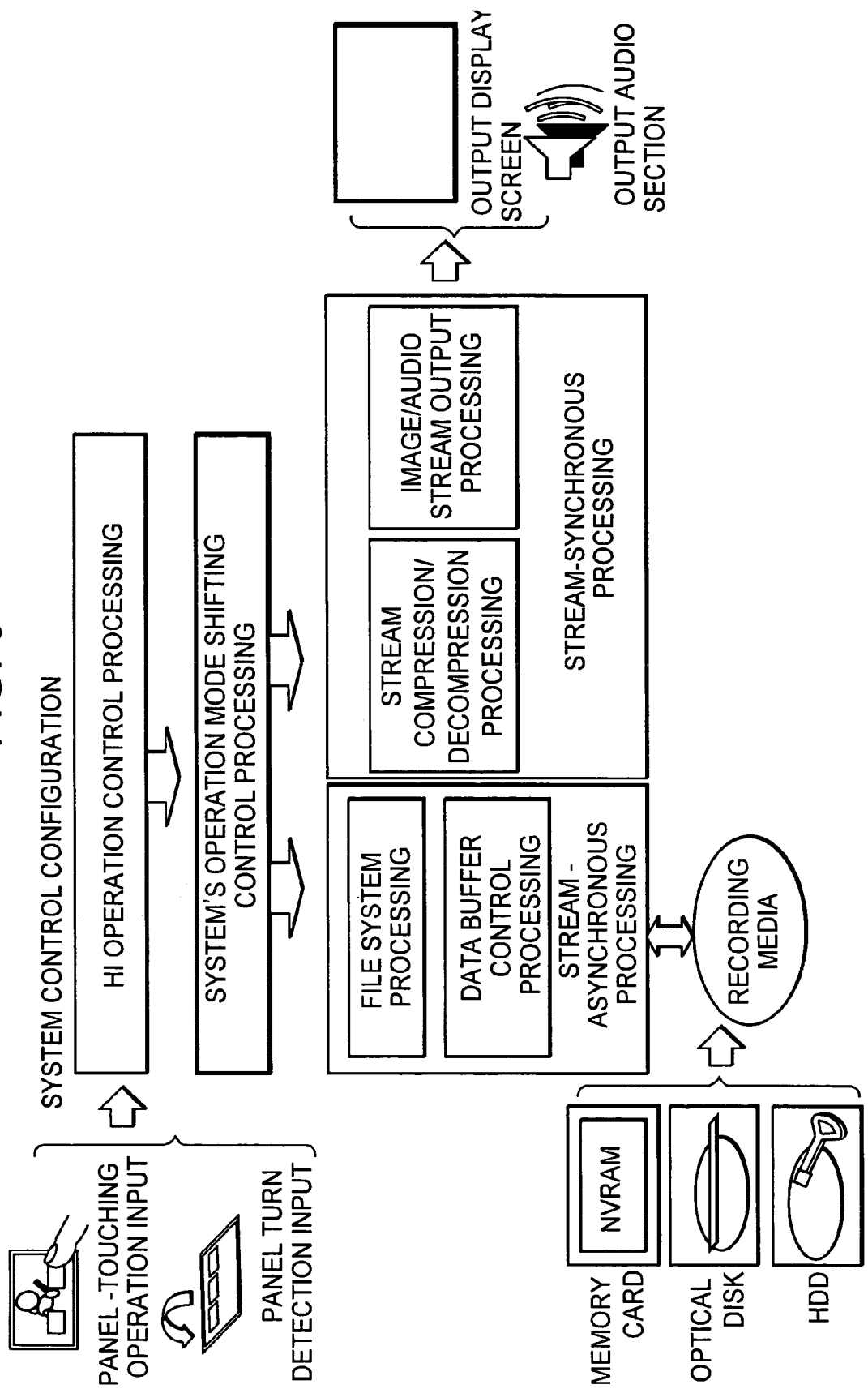
FIG. 6 is an explanatory view illustrating an example of an operation of the apparatus shown in FIG. 4.

FIG. 5 illustrates a flow of a control operation and a process timing chart of this example. FIG. 6 illustrates flows of data streams in the recording system and the display system in this example.

By the way, views shown in the top part of FIG. 5(A) schematically and chronologically represent a user's operation of turning a touch-panel-integrated image display panel, which is turnably and axially supported by the main unit of the imaging apparatus, by a user's finger.

Still further, a figure shown in the upper half of FIG. 5(B) is a view illustrating a flow of internal processing performed when an erroneous operation occurs in a case of a conventional touch-panel-integrated image display panel.

In addition, a figure shown in the lower half of FIG. 5(C) is a view illustrating a flow of internal processing performed when an occurrence of an erroneous operation is prevented in a case of a touch-panel-integrated image display panel of this example.

First, a conventional operation shown in FIG. 5(B) is described in the following.

A panel REC touch input signal process, which is an item shown in FIG. 5(B), is a recording start operation input signal process of inputting a recording start operation that occurs when a REC button displayed on the display screen is touched.

Still further, a panel STOP touch input signal process is a recording stop operation input signal process of inputting a recording stop operation that occurs when a STOP button displayed on the display screen is touched.

Also, in an image recorder Data Buffer storage operation process, camera image input signals are received, and image data compression process is performed for recording thereof in the media. Then, when a predetermined amount of the data is stored, an operation of recording the data in recording media is started.

Also, in an image recorder Data Write Command operation process, when image-data-compressed data, whose amount is equal to or more than a predetermined amount, is stored in the data buffer, an operation of recording the data in the recording media in a burst manner is performed by issuing a Write command.

By the way, if a user erroneously touches the REC button on the panel display when turning the panel, a signal, which indicates that the REC button is touched, is inputted as a REC start operation signal in the panel REC touch input signal process.

In the image recorder Data Buffer storage process by the image recorder receiving this signal, the mode is shifted from the standby mode to the camera recording mode. Subsequently, the storing of the data, which is obtained by performing the image data compression on the camera image input signal so as to record the signal, in the data buffer is started.

Still further, in parallel with this process, an initial routine of performing media boot processing in the recording media Data Rec process is started in the image recorder Data Write Command operation process. Then, a signal, which indicates that the media drive becomes ready, is returned to the image recorder.

When it is confirmed that the drive is ready, the image recorder Data Buffer storage operation process subsequently enters Data In/Data Out FIFO processing. While data obtained by performing image-data-compression on the camera image input signal so as to record the signal is stored in the data buffer, a Write Command is issued, so that the data is written to the media in units of predetermined clusters.

In such an image recording apparatus, when data is written to the media, discontinuous transfer thereof is performed at each issuance of the command.

At this event, a user, who has noticed that the user performed an erroneous operation on the touch panel, touches the STOP display button, so that an operation of outputting a panel STOP touch input signal is performed.

At this event, the mode controller of the image recorder stops the Data In/Data Out FIFO processing in the image recorder Data Buffer storage operation process. Also, the issuance of a Write command is stopped and the issuance of a Flush Cache command to the recording media is performed in the image recorder Data Write Command operation process.

As a result of the above-mentioned process, data recording due to an erroneous operation of the button is performed on the media.

Next, an operation of the example illustrated in FIG. 5(C) is described.

A panel REC touch input signal process, which is an item shown in FIG. 5(C), is the recording start operation input signal process of inputting the recording start operation that occurs when the REC button displayed on the display screen is touched.

Still further, a panel STOP touch input signal process is the recording stop operation input signal process of inputting the recording stop operation that occurs when the STOP button displayed on the display screen is touched.

In addition, in a panel revolution operation detection signal process, if an operation of axial turn of a touch-panel-integrated display screen occurs, it is detected that the panel is turned.

Still further, in the image recorder Data Buffer storage operation process in the image recorder receiving a camera image input signal, image data compression processing is performed so as to record the data in the media, and when a predetermined amount of data is stored, the recording of the data in the media is started.

In addition, in the image recorder Data Write Command operation process, when image-data-compressed data, whose amount is equal to or more than a predetermined amount, is stored in the Data Buffer, an operation of recording the data in the recording media in a burst manner is performed by issuing a Write command.

By the way, if the user erroneously touches the REC button on the panel display when turning the panel, a signal, which indicates that the REC button is touched, is inputted as a REC start operation signal in the panel REC touch input signal process.

In the image recorder Data Buffer storage process by the image recorder receiving this signal, the mode is shifted from the standby mode to the camera recording mode. Subsequently, the storing of the data, which is obtained by performing the image data compression on the camera image input signal so as to record the signal, in the Data Buffer is started.

Still further, in parallel with this process, an initial routine for performing media boot processing in the recording media Data Rec process is started in the image recorder Data Write Command operation process. Then, after an operation of checking the inside of the drive, a signal, which indicates that the media drive becomes ready, is returned to the image recorder.

In such an apparatus, in the image recorder data buffer storage operation process, as preparation for starting recording of data in media, the storage process in the data buffer is performed before the recording of data in the media is started.

By the way, a panel revolution operation detection signal generated by turning the panel causes issuance of a forced mode shifting control signal, which is used for forcibly shifting the REC mode to the standby mode, to the mode shifting section in the system controller to thereby return the mode of the image recorder to the standby mode.

This process prevents the start of recording data in the recording media from being started by an occurrence of an erroneous operation of the operation button provided in the touch panel that a user erroneously touches by turning the panel.

In addition, even when the button is frequently touched in the course of an operation of turning of the panel, a REC operation input signal, which is a mode shifting signal by inputted from the REC button of the touch panel, blocks the shifting of the mode to the REC mode in the mode shifting section of the system controller according to the panel revolution operation detection signal. Thus, the start of recording by an erroneous operation of the panel is blocked.

Figure 7:
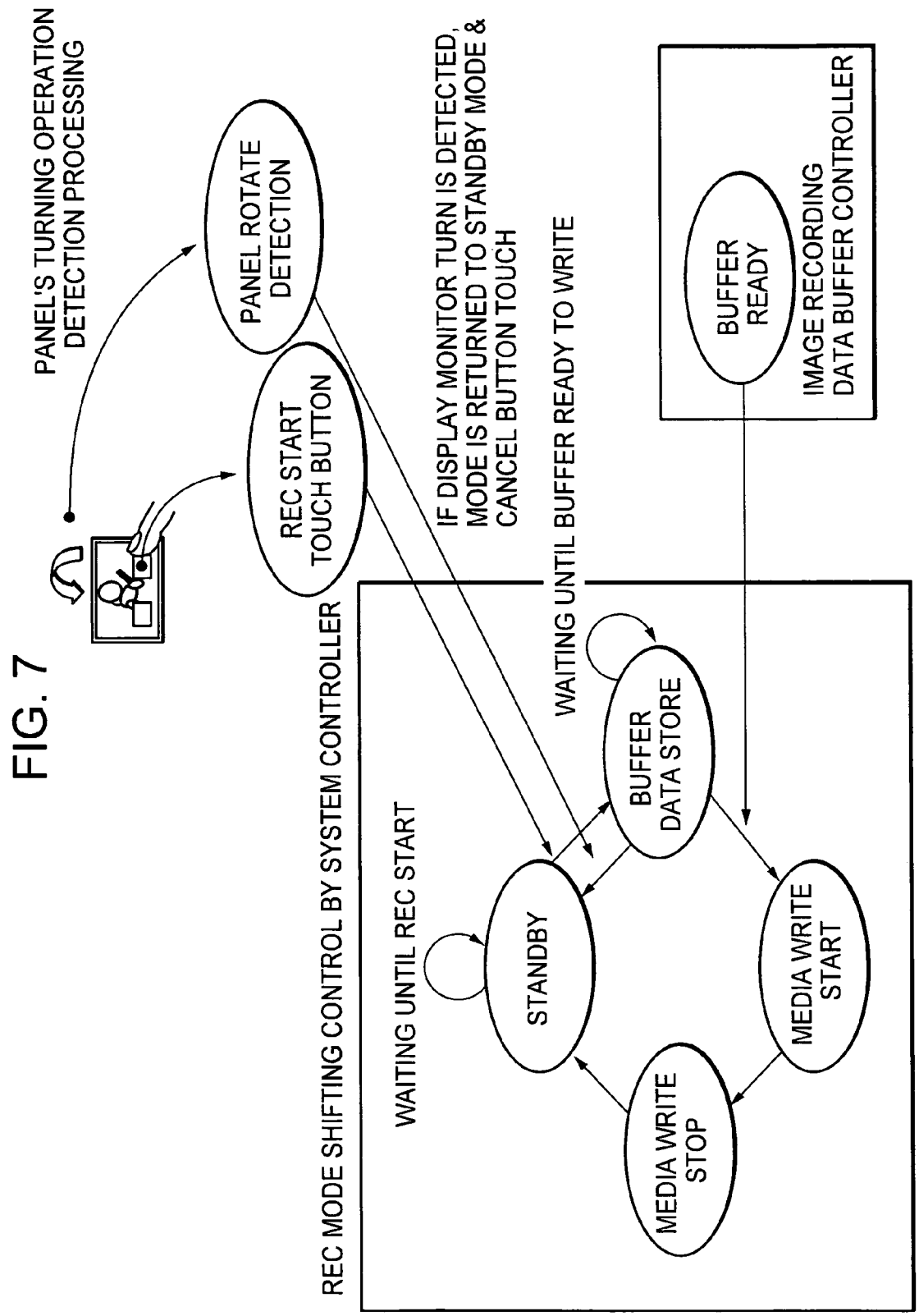
FIG. 7 is an explanatory view illustrating an example of an operation of the apparatus shown in FIG. 4.

Next, FIG. 7 is an explanatory view illustrating a primary process operation of REC mode control of the system controller.

First, a first state of the system controller is a state in which the system controller is in the standby mode and waits for a start operation input.

At this event, if a REC start button operation input is received, the mode of the system controller is shifted to a Buffer Data Store mode that is a second state thereof. In this state, compression-encoding of image data sent from the camera section for recording thereof, and the storage of data in the buffer data is started. Until a predetermined amount of data is stored, the controller waits for Data Buffer Ready in the image recorder.

At this event, if a turning operation of the image display panel is detected and inputted from the turning operation detection section for detecting a turning operation of the turnably and axially supported turning shaft of the panel, the Buffer Data Store mode is forcibly shifted to the Standby mode, so that the system controller is returned to the first state in which the system controller waits for a REC start operation input.

Subsequently, the image recorder is put in a Buffer Ready state, so that image compression data is sufficiently stored in the buffer. When the system controller is brought into a state in which the recording of data in the media can be started, the state thereof is shifted to a Media Write Start mode that is a third state thereof. In this state, the writing of data from the data buffer to the recording media is commenced. Storage of data in the camera image data buffer of the image recorder by compression-encoding, and the writing of the compressed image data from the data buffer in the recording media are performed in such a way as to be an FIFO operation.

In addition, if a Stop operation input for instructing the termination of the compression-encoding of the camera image data and for instructing the finish of the writing of data in the recording media is performed, the system controller enters a REC Stop mode that is a fourth state. After the recording finish setting process of each section is performed, the system controller is returned to the Standby mode that is the first state.

Next, a second concrete example is described.

FIG. 8 to FIG. 12 are views illustrating the second concrete example according to a preferred embodiment of the present invention. A case of applying the functions of this example of preferred embodiment of the present invention to a reproducing operation is described in the following. By the way, constituents common to these figures are described by being designated by same reference numbers or characters.

In this example, the reproducing of data in the display panel is started if an operation of commencing a reproducing mode by panel touch input is detected. A panel turn operation detection signal is monitored over a time period. When the detection signal is detected, the operation mode is forcibly returned from the reproducing mode to a standby mode.

Figure 8:
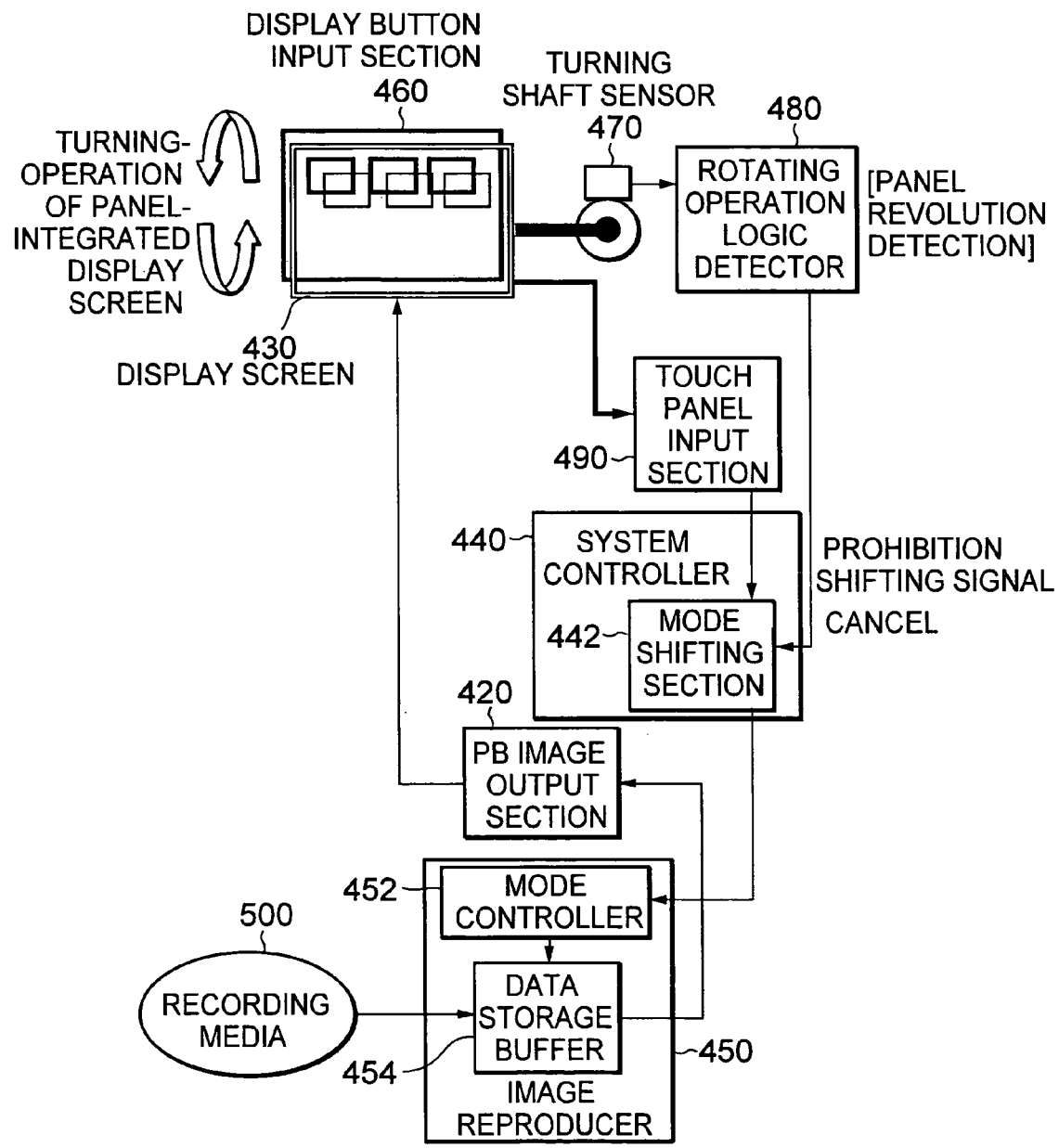
FIG. 8 is a block diagram illustrating a second example of the concrete configuration of another preferred embodiment of the invention.

As shown in FIG. 8, the imaging apparatus of this example of preferred embodiment has an imaging block 410, a PB (reproducing) image output section 420, a display screen 430, a system controller 440, an image reproducer 450, a display button input section 460, a turning shaft sensor 470, a turning operation logic detector 480, and a touch panel input section 490. The recording medium 500, in which an original image has been recorded by including small images (thumbnail images) for retrieval, is reproduced.

The turning shaft sensor 470 is operative to detect a turn of a support shaft of the display panel. The turning operation logic detector 480 detects a revolution of the display panel from a detection signal sent from this turning shaft sensor 470.

Still further, the system controller 440 is provided with a mode shifting section 442. The image recorder 450 is provided with a mode controller 452 and a Data storage buffer 454.

In the display button input section 460, the thumbnail images are displayed in such a way as to be adjusted to a predetermined position of the display screen 430. When it is detected that a thumbnail designation area region is touched, the section 460 outputs XY coordinates to the touch panel input section 490. The touch panel input section 490 discriminates whether or not the XY coordinates are within a thumbnail display region range. Then, the section 490 inputs a signal to the mode shifting section 442 in the system controller 440.

The mode shifting section 442 of the system controller 440 receives a thumbnail selection input signal from the touch panel input section 490 and then outputs a mode shifting signal and a thumbnail image selection signal to the mode controller 452 of the image reproducer 450.

The mode controller 452 of the image reproducer 450 receives the mode shifting signal from the mode shifting section 442 of the system controller 440 and then shifts the mode of the image reproducer 450 from the standby mode to a reproducing PB mode.

Original image data corresponding to the thumbnail selection signal is retrieved from the recorded media and read out. After a predetermined amount of this data is stored, the compressed data representing the original image is read from the data storage buffer by being decompressed. Then, the read data is outputted from the PB reproducing image output section to the display screen. As a result, by being linked with the selection of the thumbnail image, the corresponding original image data is reproduced.

The display screen 450 is turnably latched to the main unit of the imaging apparatus. A detection signal is inputted to the turning operation logic detector 480 from the turning shaft sensor 470 for detecting a turn of the shaft of the display screen 450.

The turning operation logic detector 480 outputs a turning operation logic detection signal as a logic signal. In the mode shifting section 442 of the system controller 440, which receives the turning operation logic detection signal, a mode transition control operation of forcibly returning the mode to the standby mode, in which the apparatus is set before the reproducing operation is started, is performed, in the course of the preparation for reading, and of the storage of the data in the reproducing buffer 454 after the reproducing operation is started.

As a result, the selective reproducing of the original image from the media and the switching of the screen are prevented from starting and being performed and are respectively prevented from starting by an erroneous touch to the operation button during the panel turn operation.

Figure 9:
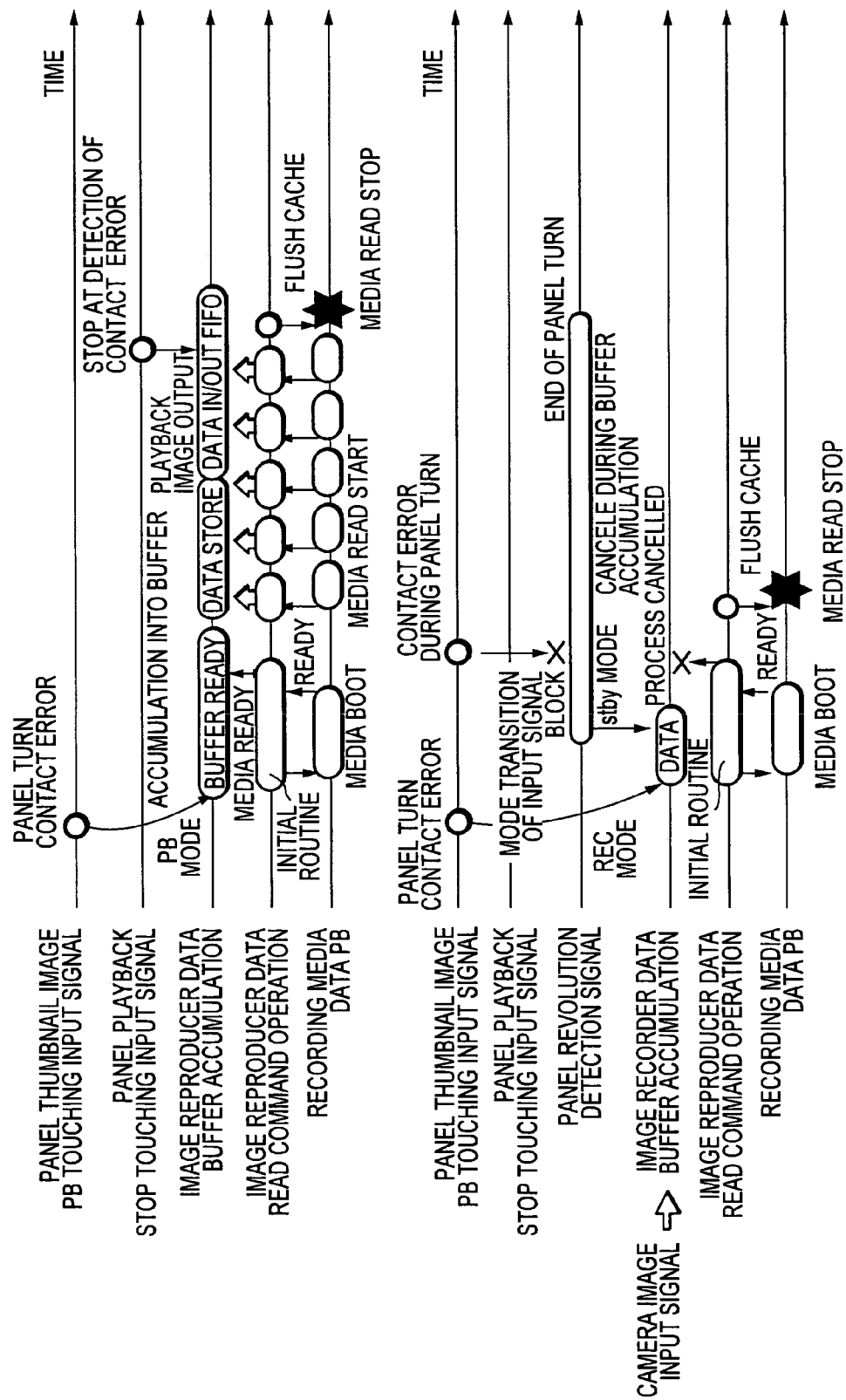
FIG. 9 is an explanatory view illustrating an example of an operation of the apparatus shown in FIG. 8.
Figure 10:
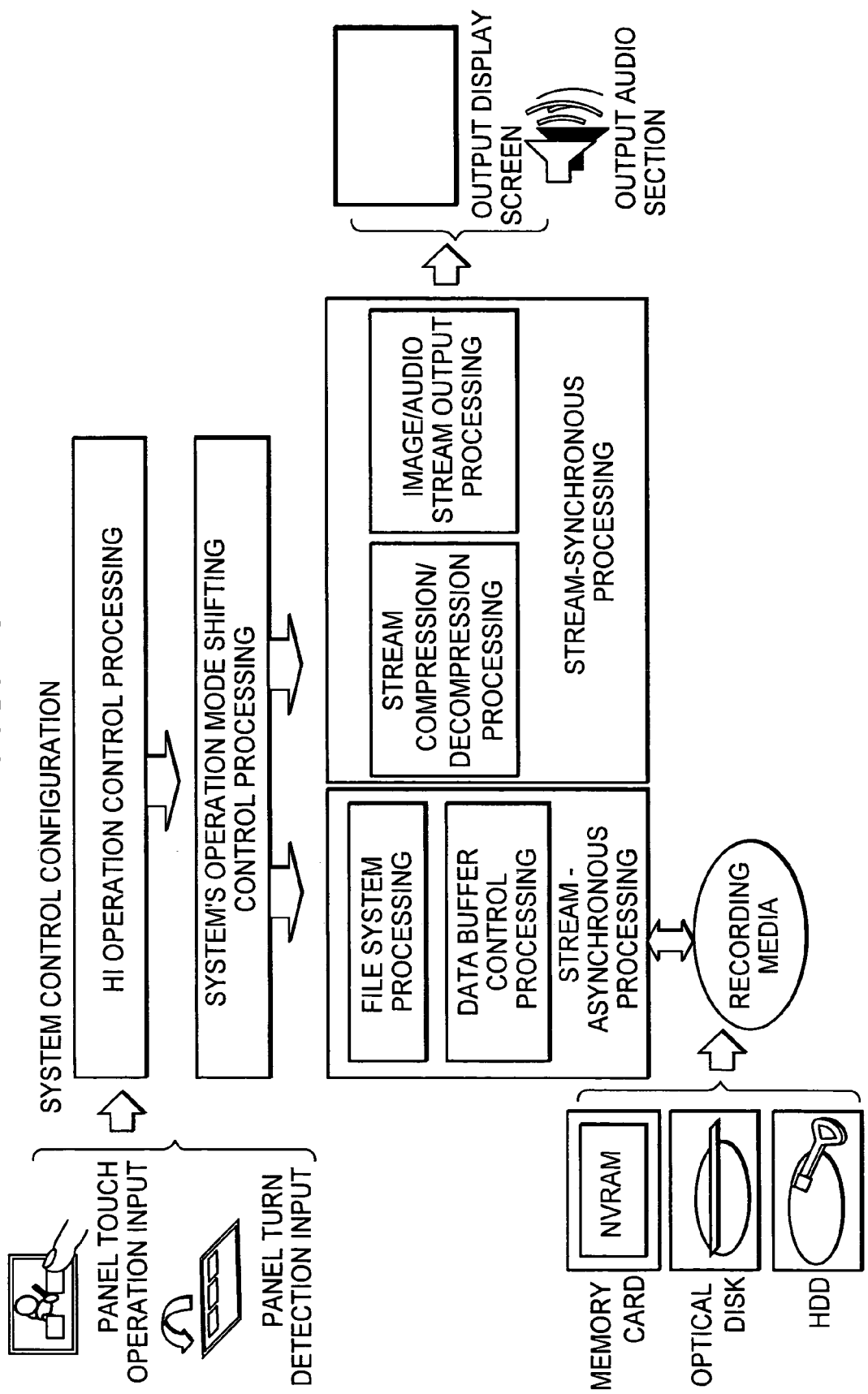
FIG. 10 is an explanatory view illustrating an example of an operation of the apparatus shown in FIG. 8.

FIG. 9 illustrates a flow of a control operation and a process timing chart of this example. FIG. 10 illustrates flows of data streams in the recording system and the display system in this example.

By the way, views shown in the top part of FIG. 9(A) schematically and chronologically represent a user's operation of turning a touch-panel-integrated image display panel, which is turnably and axially supported by the main unit of the imaging apparatus, by a finger.

Still further, a figure shown in an upper half of FIG. 9(B) is a view illustrating a flow of internal processing performed when an erroneous operation occurs in a case of a conventional touch-panel-integrated image display panel.

In addition, a figure shown in a lower half of FIG. 9(C) is a view illustrating a flow of internal processing performed when an occurrence of an erroneous operation is prevented in a case of a touch-panel-integrated image display panel of this example.

First, a conventional operation shown in FIG. 9(B) is described.

A panel PB touch input signal process, which is an item shown in FIG. 9(B), is a reproducing start operation input signal process of inputting a reproducing start operation that occurs when a selection button adjusted to the thumbnail image display region, which is displayed on the display screen, is touched. Still further, a panel STOP touch input signal process is a reproducing stop operation input signal process of inputting a recording stop operation that occurs when a STOP button displayed on the display screen is touched.

Also, in an image recorder Data Read Command operation process, an operation of reproducing the data in the recorded media in a burst manner is performed by issuing a Read command.

Also, in an image recorder Data Buffer storage operation process, the image read from the media is received, and image data decompression process is performed for displaying the image. Then, when a predetermined amount of the data is stored, an operation of reproducing the data in the reproducing PB output section 420 is started.

By the way, if a user erroneously touches the thumbnail image selection button displayed on the panel display when turning the panel, a signal, which indicates that the thumbnail image selection button is touched, is inputted as an original image reproducing start operation signal in the panel PB touch input signal process.

In the image reproducer Data Read Command operation process in the image reproducer receiving this signal, the preparation processing for reading the media is performed in the recorded media Data PB process. Then, a signal, which indicates that the drive becomes ready for reading, is returned to the image reproducer.

In the image reproducer Data Buffer storage process, the mode is shifted from the standby mode to the image reproducing mode. Subsequently, when it is confirmed that the drive for the media is ready, the original image compressed data linked with and corresponding to the thumbnail image selected from the recorded media is read. It is started to take the read image into the Data buffer. The image reproducer Data Buffer storage operation process is continued until a predetermined amount of data is stored in the data buffer.

Thereafter, the process enters the Data In/Data Out FIFO processing. While the storing of the compressed image data read from the media in units of predetermined clusters by issuing a Read Command, the decompression of the compressed image data read from the Data Buffer is performed, so that a process of outputting a reproduced original image corresponding to the selected thumbnail image is performed in the PB image output section to the display screen.

At this event, a user, who has noticed that the user performed an erroneous operation on the touch panel, touches the STOP display button, so that an operation of outputting a panel STOP touch input signal is performed.

The mode controller of the image reproducer does not stop the Data In/Data Out FIFO processing in the image reproducer Data Buffer storage operation process until this moment. Also, the image data decompression output operation process in the image reproduced, and the issuance of a Writer command to the recording media is stopped and the issuance of a Flush Cache command to the recording media is performed. Thus, an operation of stopping the reproducing of the system is performed.

As a result of the above-mentioned process, an unintended original image is selected, read and stopped after the display is exchanged.

Next, an operation of such example of preferred embodiment, which is illustrated in FIG. 9(C), is described as follows.

A panel PB touch input signal process, which is an item shown in FIG. 9(C), is the recording start operation input signal process of inputting the recording start operation that occurs when the PB button displayed on the display screen is touched.

Still further, a panel STOP touch input signal process is the recording stop operation input signal process of inputting the recording stop operation that occurs when the STOP button displayed on the display screen is touched.

In addition, in a panel revolution operation detection signal process, if an operation of axial turn of a touch-panel-integrated display screen occurs, it is detected that the panel is turned.

Still further, in the image reproducer Data Read Command operation process, an operation of reproducing the data by reading the data from the recording media in a burst manner is performed by issuing a Read command.

In addition, the image reproducer Data Buffer storage operation process is what is called a process of shifting the operation to Data In/Data Out FIFO operation in the Data Buffer, in which the decompression of compressed image data is performed while the image data compression processing is performed for recording thereof in the media after the process of reproducing the image from the media is started, and a predetermined amount of data is stored in the Data Buffer.

By the way, if the user erroneously touches the reduced-size image thumbnail also serving as the PB button in the panel display when turning the panel, a signal, which indicates that the PB button is touched, is inputted to be selected as a Play Back start operation signal, together with the thumbnail image, in the panel PB touch input signal process. In the image recorder Data Buffer storage process by the image recorder receiving this signal, the mode is shifted from the standby mode to the read Buffer Data Store mode. Subsequently, the original image data corresponding to the thumbnail image is read from the recorded media in units of sectors by retrieving thereof according to the address thereof.

Then, the storing of the read image-data-compressed data in the Data Buffer is started. In such an image recording apparatus, the storing of the data in the Data Buffer is performed as preparation for starting the reproduction of the compressed data, which is read from the media in the image recorder Data Buffer storage operation process.

At such event, a panel revolution operation detection signal generated by turning the panel causes the mode of the image reproducer to the standby mode by issuing a forced mode shifting control signal, which is used for forcibly shifting the PB mode to the standby mode, to the mode shifting section of the system controller.

This process prevents replacement of the display from being performed by the commencement of reading, decompressing and displaying the original image corresponding to the reduced size image from the recorded media, which is caused by an occurrence of an erroneous operation of the operation button in the touch panel due to the user's touch the reduced size image (the thumbnail image) at the turning of the panel.

Still further, even when the button is frequently touched in the course of an operation of turning of the panel, a thumbnail image selection operation input from the thumbnail reduced-size image button of the touch panel and a PB mode shifting signal, which is a PB operation input signal, block the shifting of the mode to the PB mode in the mode shifting section of the system controller according to the panel revolution operation detection signal. Thus, the reproduced original image is prevented from being displayed.

Figure 11:
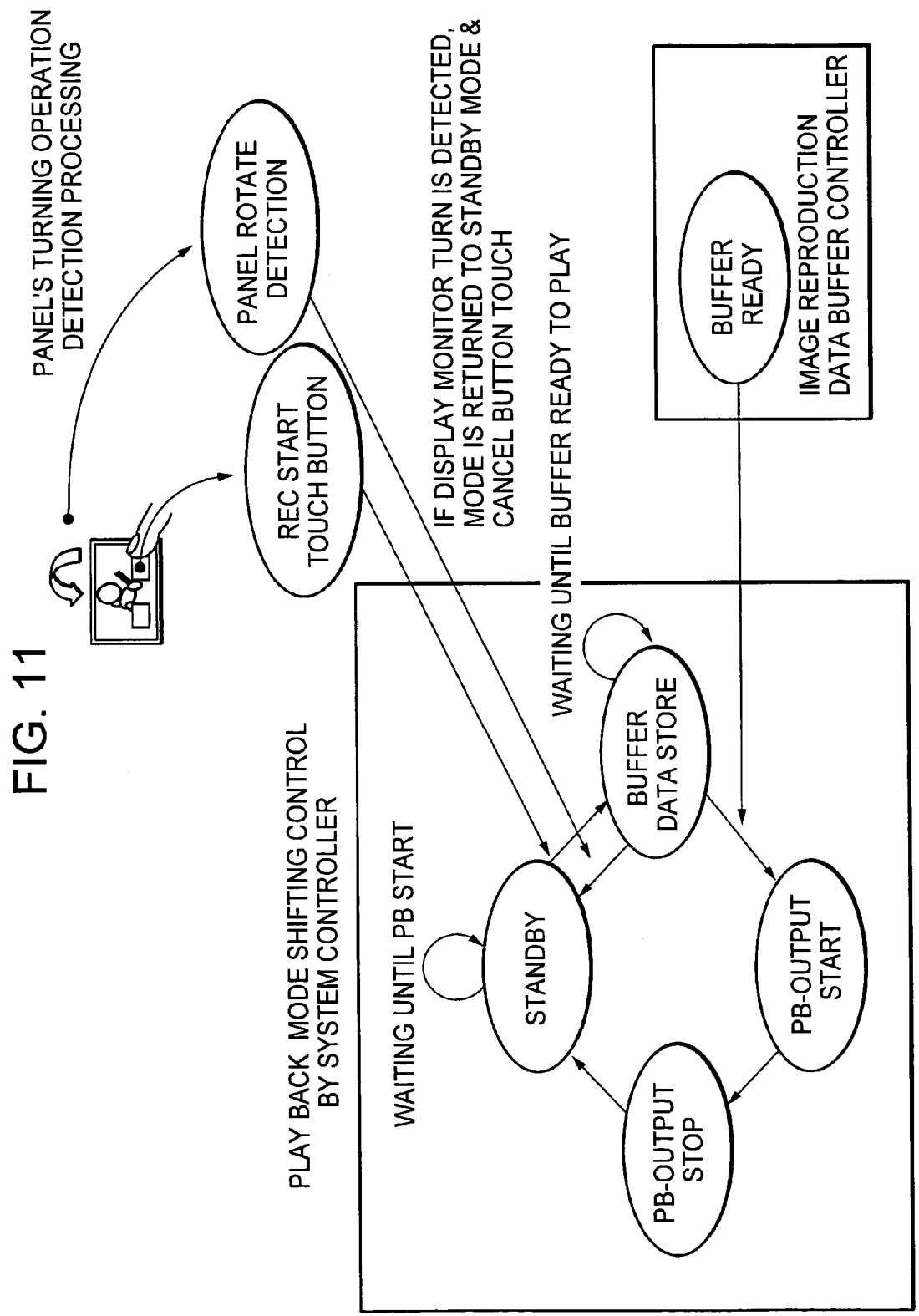
FIG. 11 is an explanatory view illustrating an example of an operation of the apparatus shown in FIG. 8.

FIG. 11 is an explanatory view illustrating a primary process operation of a Play Back mode control of the system controller.

First, a first state of the system controller is a state in which the system controller is in the standby mode and waits for a PB start operation input.

Then, if a PB start button operation input is received, the mode of the system controller is shifted to a Buffer Data Store mode that is a second state thereof. In this state, the reading of data from the media, and the storing of the data in the Buffer Data is started. Until a predetermined amount of data is stored, the controller waits for Data Buffer Ready in the image reproducer.

At this event, if a turning operation of the image display panel is detected and inputted from the turning operation detection section for detecting a turning operation of the turnably and axially supported turning shaft of the panel, the Buffer Data Store mode is forcibly shifted to the StandBy mode, so that the system controller is returned to the first state in which the system controller waits for a PB start operation input.

When the image reproducer is put in a Buffer Ready state, so that decompression, reproduction, and output of the image data can be started, the mode of the system controller is shifted to a PB-output Start mode that is a third state. In this state, the output of the original image, which is linked with and corresponds to the thumbnail image read from the recorded media, to the display screen is started. The Data Buffer outputs the original image data to the image reproducer by decompression-decoding of the image while the compressed image data is read from the recorded media.

When the reading of the original image data and the decompression-decoding of the image are finished, the mode of the system controller enters a PB-output Stop mode that is a fourth state in which the reproduction finish setting process of each reproducer is performed. Then, the mode thereof is shifted to the Standby mode that is the first state.

Figure 12:
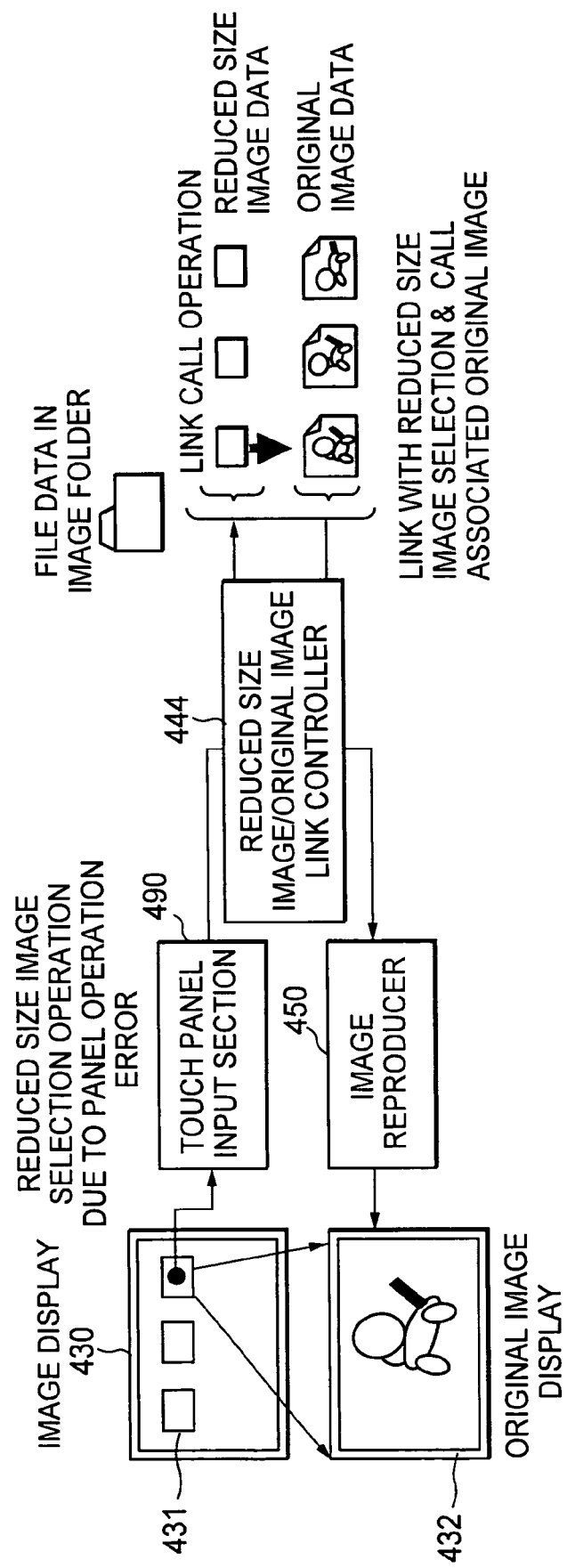
FIG. 12 is an explanatory view illustrating an operation of access to a file of a captured image file database in the apparatus shown in FIG. 8.

FIG. 12 is an explanatory view illustrating an operation of accessing a file of a captured image file database.

As shown in FIG. 12, thumbnail images 431 are displayed in the display screen 430 integrated with the touch panel in such a way as to be arranged at predetermined and designated positions.

If a user erroneously touches one of the thumbnail images when turning the display screen (display panel) 430, a reduced size image selection operation input and a PB start operation input due to the erroneous panel operation error have been conducted.

A reduced size image selection operation input signal and a PB start operation input signal enter the reduced size image/original image controller 444 of the system controller 440. Then, original image data, which is linked with and called and corresponds to the reduced size image data, is accessed, read and decomposition-decoded by retrieval thereof on the media of the file system. Thus, an output from the image reproducer 450 is replaced therewith, so that the original image 432 is displayed on the display screen 430.

[Second Example of Preferred Embodiment of the Present Invention]

Next, a second example of preferred embodiment of the present invention is described.

In the foregoing description of the first example of preferred embodiment of the present invention, an example of application of the invention to the camera-integrated recorder has been described. The invention can be applied to other imaging apparatuses. In the description of the second example of preferred embodiment of the present invention, an example of application of the invention to a camera-equipped portable telephone is described.

Figure 13:
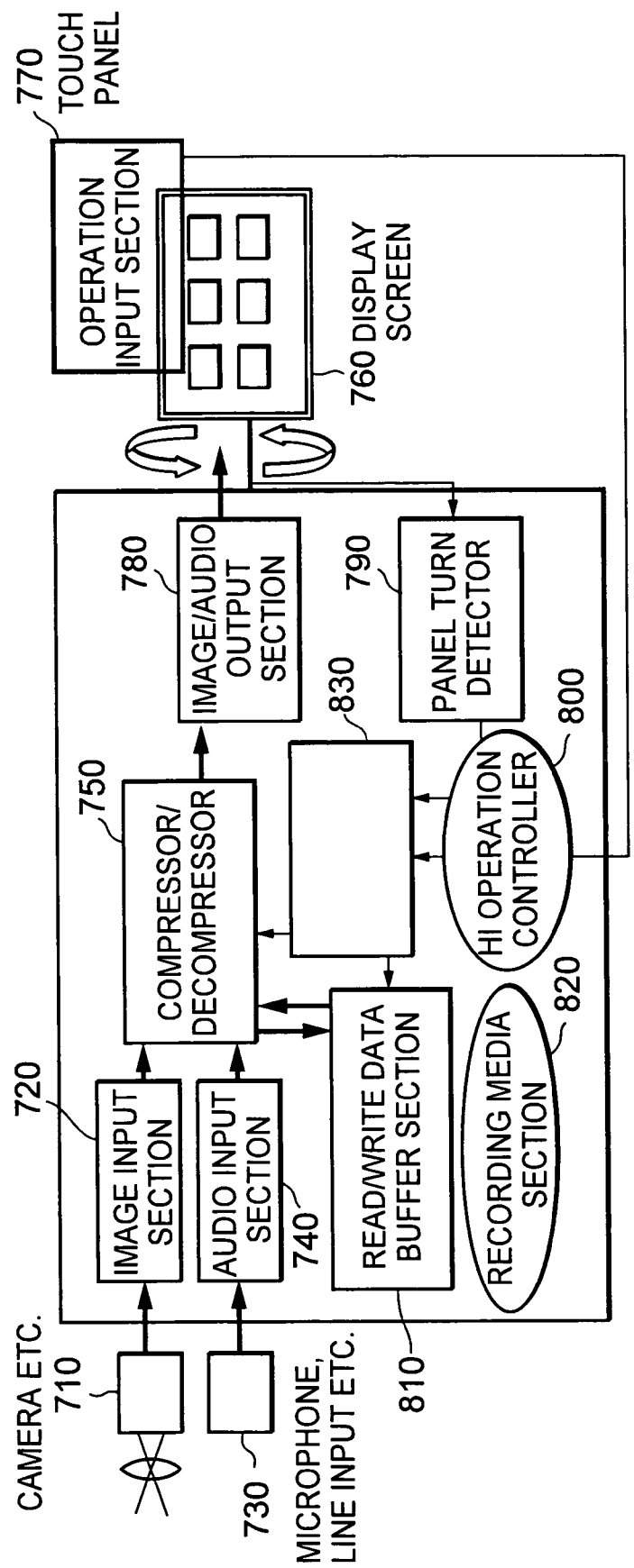
FIG. 13 is a block diagram illustrating the hardware configuration of a camera-equipped portable telephone according to a preferred embodiment of the invention.
Figure 14:
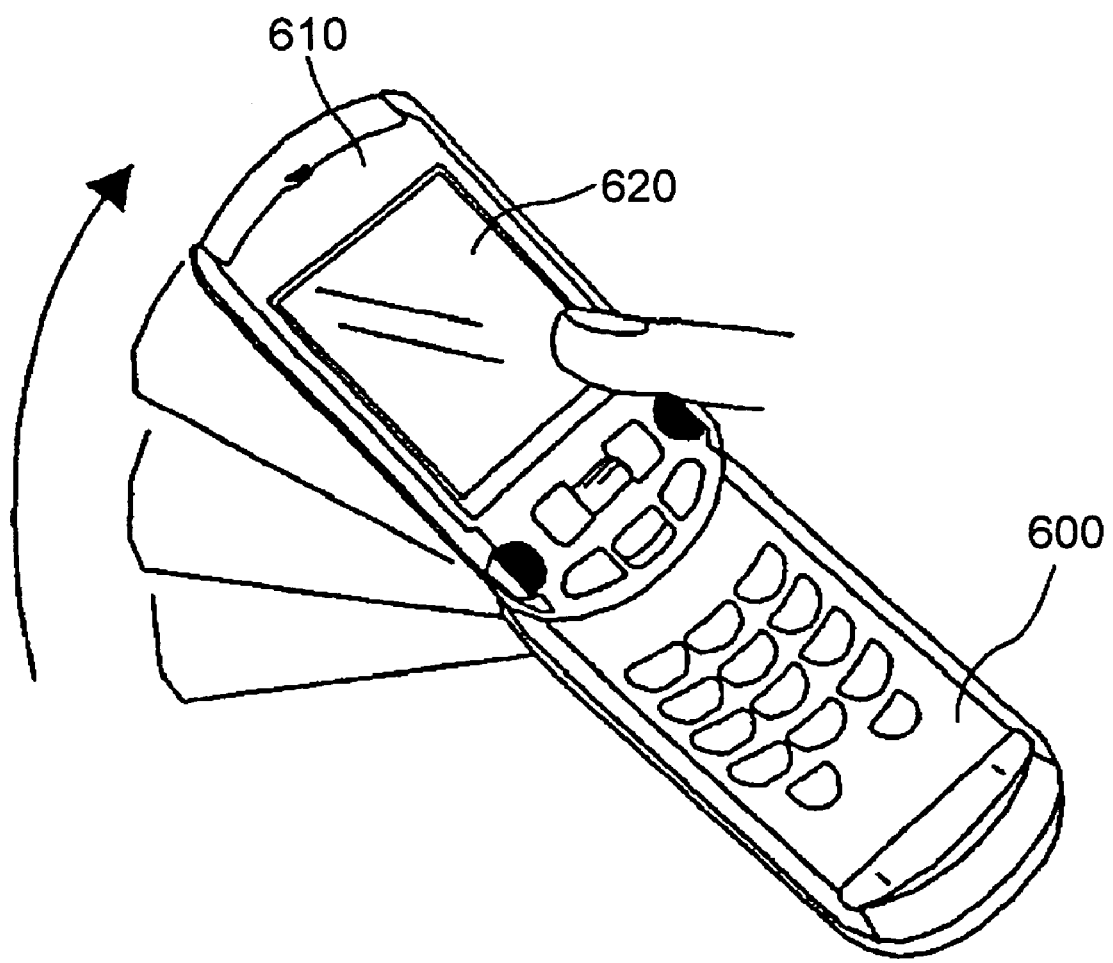
FIG. 14 is a perspective view illustrating an external view of the portable telephone shown in FIG. 13.

FIG. 13 is a block diagram illustrating an example of the concrete configuration of the camera-equipped portable telephone according to a second example of preferred embodiment of the present invention. FIG. 14 is a perspective view illustrating the operation of the portable telephone device.

As shown in FIG. 14, the portable telephone according to this example of preferred embodiment of the present invention is provided a display panel 620 at the side of a cover 610 connected to the main unit 600 of the telephone through a tilting mechanism, such as a hinge mechanism. Still further, operation buttons of the touch panel type are provided at the side of this display panel 620. Similarly with the above-mentioned first example of preferred embodiment of the present invention, various kinds of processes can be performed by being operated from the touch panel.

Still further, as shown in FIG. 13, the portable telephone of this example of preferred embodiment of the present invention has an image input section 720 to which images are inputted from a camera 710, an audio input section 740 to which audio data is inputted from a microphone, a line input section 730, a compressor/decompressor 750 for performing decompression/compression of images and audio, a display screen 760 for indicating the image and the audio, a touch panel (operation input section) 770 provided in the display screen 760, image/audio output section 780 for outputting images and audio, a panel turn detector 790 for detecting a turn of the display panel, a human interface (HI) operation controller for processing operation input, a read/write data buffer 810 for temporarily storing read/write data in media, a recording media section 820 for controlling recording of data onto and reproducing of data from media, and a system operation mode controller 830 for controlling the entire system.

In addition, in this example of preferred embodiment, if a mode shifting instruction is issued by being inputted from the touch panel 770, data is temporarily stored by using the read/write data buffer 810. A turn of the display panel within a time lapse is detected by the panel turn detector 790. When the turn of the display panel is detected, this operation is decided as an erroneous operation, so that the mode of the display panel is returned to an original operation mode. Then, this example of preferred embodiment of the present invention may be adapted so that at such event, an imaging apparatus user's attention is attracted by indicating a warning message "the display panel is being turned. Therefore, the operation of the button is canceled" for several seconds, concretely, 2 to 3 seconds.

By the way, the imaging apparatus of the present invention is not limited to the above-mentioned examples of preferred embodiments, which are merely descriptions of the present invention in its preferred form under a certain degree of particularity. It should be understood that they are by no means to be construed so as to limiting the scope of the present invention. It is therefore to be understood to those of ordinary skill in the art that many other changes, variations, combinations, sub-combinations and the like are possible therein without departing from the scope and spirit of the present invention.

For example, in the above-mentioned embodiments, mainly the detection of a turn of the display panel is used for judgment on an erroneous operation. However, in addition, change in the inclination thereof by a hinge mechanism may be detected and used for judgment on the erroneous operation.

Still further, it is not necessary that the operation buttons on the display panel for judgment on an erroneous operation. The invention may be applied to the imaging apparatus employing push buttons.

Still further, recording media to be used are not limited to the above-mentioned optical disc type media. Data of a predetermined number of minutes may be data-compressed and temporarily stored in a built-in buffer memory and then written to recording media. Alternatively, compressed data may be read from recording media and the compressed data of several minutes may be temporarily stored in a built-in buffer memory, and thereafter the data may be decompressed and outputted in the form of images and audio. Alternatively, the recording media to be used may be magnetic disc type media, and semiconductor memory media, which are used in an image/audio digital data imaging apparatus incorporating a drive that takes a time lapse until the drive becomes ready for accessing data in response to a command. Alternatively, the invention can be applied to an imaging apparatus using magnetic tape type media.

Still further, in the foregoing description, mainly operations of the button during the recording or reproducing of the data have been described. However, the above-mentioned operation mode shifting control operation can similarly be applied to cases of, for example, operating the buttons for adjusting the brightness or the contrast of the display screen.

What is claimed is:

1. An imaging apparatus comprising:
    a body provided with an imaging section for image-capturing;
    a recording section for storing image data of an image captured by the imaging section into a recording medium;
    a display panel enabled for tilting movement provided by a tilting structure of the body;
    operation buttons provided on the display panel;
    a detector for detecting tilting displacement of the display panel;
    a data buffer for temporarily storing the image data; and
    a controller for:
    performing an operation mode corresponding to an instruction entered by an operation button when a shifting of an operation mode is instructed;
    temporarily storing the image data using the data buffer;
    monitoring the tilting displacement of the display panel by the detection means;
    canceling the shifting of the operation mode when the tilting displacement of the display panel is detected within a predetermined time period; and
    returning the operation mode to an original operation mode.

2. The imaging apparatus according to claim 1 wherein the operation buttons comprise operation buttons of a touch panel-type.

3. The imaging apparatus according to claim 1 wherein:
the tilting structure includes a rotative structure for rotating the display panel around a supporting axis; and
the detector comprises a rotation detecting unit for detecting rotation of the display panel by the rotative structure.

4. The imaging apparatus according to claim 1 wherein:
the tilting structure includes a hinge structure for opening and closing the display panel relative to the body; and
the detector comprises a detecting unit for detecting an open/close displacement of the display panel about the hinge structure.

5. The imaging apparatus according to claim 1 wherein the controller:
stores image data captured by the imaging section into the data buffer when an image-capture operation is instructed through an operation of the operation button;
monitors a tilt displacement of the display panel through the detector;
cancels the image-capturing operation when a tilting displacement of the display is detected within a predetermined time period; and
returns the operation mode to an original operation mode.

6. The imaging apparatus according to claim 1 wherein the controller:
stores reproduction data from the recording medium into the data buffer when a reproduction operation is instructed through operating the operation button;
monitors tilt displacement of the display panel through the detector;
cancels the reproduction operation when a tilting displacement of the display is detected within a predetermined time period; and
returns the operation mode to an original operation mode.

7. The imaging apparatus according to claim 1 wherein the controller:
cancels the shifting of the operation mode; returns the operation mode to an original operation mode; and performs a process of displaying on the display panel a message indicating performance of the returning process.

8. An imaging system controlling method comprising:
an imaging process of capturing an image by an imaging section provided in a body;
a recording process of storing image data of the image captured by the imaging section into a recording medium;
a display process by using a display panel having a tilting movement provided by a tilting structure of the body;
an operation process of operating buttons provided on the display panel;
a detecting process of detecting tilting displacement of the display panel;
a temporary storage process of temporarily storing image data;.and
a controlling process of:
performing an operation mode corresponding to an instruction entered using an operation button when shifting of an operation mode is instructed;
temporarily storing the image data by using the data buffer;
monitoring tilting displacement of the display panel by the detection means;
canceling the shifting of the operation mode when the tilting displacement of the display panel is detected within a time lapse; and
returning the operation mode to an original operation mode.

9. The imaging system controlling method according to claim 8, wherein the control process cancels the shifting of the operation mode; returns the operation mode to an original operation mode; and performs a process of displaying on the display panel a message indicating performance of the returning process.

10. The imaging system controlling method according to claim 9, wherein the display process is performed during a predetermined time period.

* * * * *